United States Patent
Bhattacharya (10) Patent No.: US 11,280,444 B2
(45) Date of Patent: Mar. 22, 2022

(54) STIFFENING DEVICE FOR A BASE FRAME OF ROTATING MACHINES

(71) Applicant: Mantosh Isanchandra Bhattacharya, Patna (IN)

(72) Inventor: Mantosh Isanchandra Bhattacharya, Patna (IN)

( * ) Notice: Subject to any disclaimer, the term of this patent is extended or adjusted under 35 U.S.C. 154(b) by 248 days.

(21) Appl. No.: 16/588,788

(22) Filed: Sep. 30, 2019

(65) Prior Publication Data

US 2021/0010630 A1 Jan. 14, 2021

(30) Foreign Application Priority Data

Jul. 10, 2019 (IN) .............................. 201931027732

(51) Int. Cl.
*F16M 7/00* (2006.01)
*F16M 5/00* (2006.01)

(52) U.S. Cl.
CPC ................ *F16M 7/00* (2013.01); *F16M 5/00* (2013.01)

(58) Field of Classification Search
CPC ................................... F16M 5/00; F16M 7/00
See application file for complete search history.

(56) References Cited

U.S. PATENT DOCUMENTS

| 6,585,079 B1* | 7/2003 | Weyer ................... B66F 9/0655 |
| | | 182/18 |
| 10,288,212 B1* | 5/2019 | Bhattacharya ........... F16M 7/00 |
| 2013/0055825 A1* | 3/2013 | Michopoulos ........... G01N 3/08 |
| | | 73/857 |
| 2016/0063846 A1* | 3/2016 | Lemire ................ A61B 5/6891 |
| | | 340/573.1 |

* cited by examiner

*Primary Examiner* — Eret C McNichols
(74) *Attorney, Agent, or Firm* — Oblon, McClelland, Maier & Neustadt, L.L.P.

(57) ABSTRACT

A stiffening device for a base frame is disclosed. The disclosed stiffening device comprises hydraulic jacks fitted with structural members of the base frame; strain gauges coupled to the structural members of the base frame, the strain gauges configured to detect deformation in the structural members of the base frame and generate first signals based on the detected deformation in the structural members; at least one signal conditioner unit coupled to the strain gauges to receive the first signals and generate second signals by performing any or a combination of amplification, filtering and conversion of the received first signals; and a hydraulic console configured to actuate at least one of the hydraulic jacks when value of received second signals is above a predefined threshold value. Upon actuation, the actuated at least one of the jacks stiffens at least one of the structural members of the base frame.

7 Claims, 10 Drawing Sheets

STIFFENING DEVICE FOR A BASE FRAME OF ROTATING MACHINES

TECHNICAL FIELD

The present disclosure relates to the technical field arrangements for mitigating structural anomaly in base frames. More specifically, it pertains to a stiffening device for mitigating structural anomaly in a grout-less base frame of a rotating machine.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

Base frames are required for mounting rotating machinery/devices. Non-grouted based frame with weak structural members in terms of directional stiffness or with any localized crack generally have more deflection than anticipated and in turn, causes high vibration on the rotating machinery. When a rocking/pitching motion at particular direction of rotating machine is observed then all normal root causes are investigated first with involvement of an experienced vibration analyst. The conventional techniques used for investigation of possibility of structural resonance or detecting a crack in structural member are cumbersome process. These techniques includes bump test, finite element analysis (FEA), experimental modal analysis to validate the FEA and mode shapes plotting or operational deflection shape (ODS) analysis/slow motion amplified video analysis take a considerable amount of time, particularly if the machines are in remote installation. Special tools such as, multi-channel vibration analyser, roving tri-axial accelerometers, instrumented hammer and vibration spectrum analyser are also required to detect the resonance or cracks in a particular structural member of the base frame.

When a crack is developed in a particular structural member of the base frame, directional stiffness gets lowered and vibration increases of machine underneath of that particular element. The detuning of base frame to shift the natural frequency Fn lies on equation Fn=$\sqrt{k/m}$, where k is stiffness and m is mass of skid). If k is increased the natural frequency of base frame structural member is shifted away from operational frequency of machine on which the machine is installed. Adding mass to subject under resonance is more difficult work. FFT spectrum of machinery vibration and ODS analysis/slow motion amplified video analysis are combined to detect a possible crack in particular load bearing structural member which is a lengthy process as it involves lost of elimination rounds based on findings in FFT spectrum. Extracting modal data using calibrated modal hammer or multichannel analyzer, analysis of vibration spectra for real and imaginary values, finding and then shifting those to Finite Element analysis software and tune original analysis reports takes weeks of work. Once resonance and associated rigid body coupled modes are detected with nodes and antinodes or a crack is detected, then machine has to be stopped and completely dismantled. On the base frame, additional structural members are welded as per Finite Element analysis report or crack repair is done. Once the welding work is over, the stress relieving activity is carried out on subject members. After that base frame is mounted, leveled and machine installation is carried out. Complete rectification work takes 2-3 weeks as minimum to carry out. This is the current practice to address and mitigate structural anomalies of the base frame of the rotating machinery, and the activities outlined above require a very specialized field of knowledge.

There is, therefore, a need in the art to provide a simple, efficient and cost effective stiffening device for mitigating structural anomaly in a base frame of a rotating machine, and require minimal manual effort.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

OBJECTS OF THE INVENTION

A general object of the present disclosure is to provide a stiffening device for a grout-less base frame of rotating machines to increase stiffness of structural members of the base frame.

An object of the present disclosure is to provide a device for mitigating structural anomaly in a grout-less base frame of rotating machines.

An object of the present disclosure is to provide a self-adjusting device for auto correcting structural anomaly in a grout-less base frame of a rotating machine.

Another object of the present disclosure is to provide a simple, efficient and cost effective device which can be easily implemented for mitigating structural anomaly in a base frame of rotating machines.

These and other objects of the present invention will become readily apparent from the following detailed description taken in conjunction with the accompanying drawings.

SUMMARY

The present disclosure relates to arrangements for mitigating structural anomaly in grout-less base frames of rotating machines. More specifically, it pertains to an improved stiffening device for mitigating structural anomaly in a grout-less base frame of rotating machines in very less time as compared to the conventional techniques.

In an aspect, the present disclosure provides stiffening device for a base frame, the device can include a plurality of strain gauges coupled to structural members of the base frame such that there being at least one of the plurality of strain gauges coupled to each of the structural members, the plurality of strain gauges coupled to at least one Wheatstone bridge circuit, the plurality of strain gauges configured to detect deformation in the structural members of the base frame and generate first signals based on the detected deformation in the structural members; a plurality of jacks fitted with the structural members of the base frame such that there being at least one of the plurality of jacks fitted with each of the structural members; at least one signal conditioner unit operatively coupled to the plurality of strain gauges to receive the generated first signals, the at least one signal conditioner unit adapted to generate second signals by performing any or a combination of amplification, filtering and conversion of the received first signals; and a console operatively coupled to the at least one signal conditioner unit to receive the generated second signals.

In an aspect, the console is configured to actuate at least one of the pluralities of jacks when value of the received second signals is above a predefined threshold value. Upon actuation, the actuated at least one of the plurality of jacks stiffens at least one of the structural members of the base frame.

In an embodiment, the actuated at least one of the plurality of jacks is configured to increase directional stiffness of the at least one of the structural members in any or a combination of horizontal direction and vertical direction, which mitigates lateral and coupled modes of movement (rocking and pitching) of machinery mounted on the base frame.

In an embodiment, the plurality of strain gauges are connected to the at least one Wheatstone bridge in a configuration comprises any of a full bridge circuit configuration, half bridge circuit configuration and quarter bridge circuit configuration.

In an embodiment, the plurality of jacks are selected from a group comprises hydraulic button jacks and hydraulic turn buckles.

In an embodiment, the console can be a hydraulic console. The console can include at least one electric motor driven hydraulic pump to pump oil from a reservoir through at least one non-return valve, and at least one solenoid controlled actuator to allow the pumped oil to enter in the at least one of the plurality of jacks for actuation of the at least one of the plurality of jacks.

In an embodiment, each of the pluralities of strain gauges is coupled to the structural members at predefined orientation.

In an embodiment, each of the plurality of jacks is fitted at predefined orientation with respect to the structural members for efficient stiffening of the structural members of the base frame upon actuation.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

The following is a detailed description of embodiments of the disclosure depicted in the accompanying drawings. The embodiments are in such details as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

If the specification states a component or feature "may", "can", "could", or "might" be included or have a characteristic, that particular component or feature is not required to be included or have the characteristic.

Exemplary embodiments will now be described more fully hereinafter with reference to the accompanying drawings, in which exemplary embodiments are shown. This disclosure may however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Various terms as used herein are shown below. To the extent a term used in a claim is not defined below, it should be given the broadest definition persons in the pertinent art have given that term as reflected in printed publications and issued patents at the time of filing.

Embodiments explained herein relate to arrangements for mitigating structural anomaly in grout-less base frames of rotating machines. In particular, it pertains to an improved and simple stiffening device which can be easily implemented for mitigating structural anomaly in a grout-less base frame of a rotating machine effectively. The disclosed device measure deflections of structural members using strain gauges and actuate hydraulic actuator for increasing effective stiffness of the structural member in a particular direction in two orthogonal planes based on signals generated by strain gauges on measurement of the deflection.

In an aspect, the present disclosure provides stiffening device for a base frame (also referred to as grout-less base frame hereinafter), the disclosed device is based on a plurality of strain gauges coupled to structural members of the base frame, the plurality of strain gauges coupled to at least one Wheatstone bridge, the plurality of strain gauges configured to detect deformation in the structural members of the base frame and generate first signals based on the detected deformation in the structural members; a plurality of jacks fitted with the structural members of the base frame; at least one signal conditioner unit operatively coupled to the plurality of strain gauges to generate second signals by performing any or a combination of amplification, filtering and conversion of the first signals; and a hydraulic console operatively coupled to the at least one signal conditioner unit to receive the generated second signals.

In an aspect, the hydraulic console is configured to actuate at least one of the pluralities of jacks when value of the received second signals is above a predefined threshold value. Upon actuation, the actuated at least one of the plurality of jacks stiffens at least one of the structural members of the base frame.

In an embodiment, the actuated at least one of the plurality of jacks is configured to increase directional stiffness of the at least one of the structural members in any or a combination of horizontal direction and vertical direction, which mitigates lateral and coupled modes of movement (rocking and pitching) of machinery.

In an embodiment, the plurality of strain gauges can be connected to the at least one Wheatstone bridge in a configuration comprises any of a full bridge circuit configuration, half bridge circuit configuration and quarter bridge circuit configuration.

In an embodiment, the plurality of hydraulic jacks are selected from a group of jack comprises hydraulic button jacks and hydraulic turn buckles.

In an embodiment, the hydraulic console can include at least one electric motor driven hydraulic pump to pump oil from a reservoir through at least one non-return valve, and at least one solenoid controlled actuator to allow the pumped oil to enter in the at least one of the plurality of jacks for actuation of the at least one of the plurality of jacks.

In an embodiment, each of the pluralities of strain gauges is coupled to the structural members at predefined orientation.

In an embodiment, each of the plurality of jacks is fitted at predefined orientation with respect to the structural members for efficient stiffening of the structural members of the base frame upon actuation.

Figure 1A:
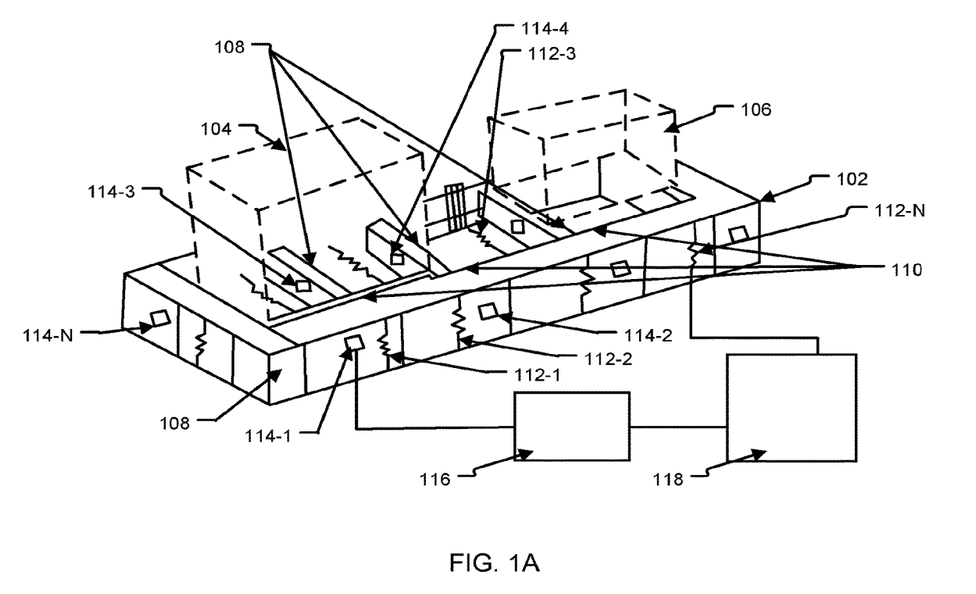
FIG. 1A illustrates an exemplary representation of the proposed stiffening device for mitigating structural anomaly in a grout-less base frame of a rotating machine, in accordance with an embodiment of the present disclosure.

FIG. 1A illustrates an exemplary representation of the proposed stiffening device for mitigating structural anomaly in a grout-less base frame of a rotating machine, in accordance with an embodiment of the present disclosure. As shown, a base frame 102 supporting a driver unit 104 and a driven unit 106 of a rotating machine. The base frame 102 includes longitudinal main structural members 108 and traverse structural members 110 coupled between the longitudinal structural members 108.

In an embodiment, the disclosed device can include a plurality of hydraulic jacking devices such as a hydraulic jack 112-1, 112-2, 112-3 . . . 112-N (collectively referred to as hydraulic jacks 112) (represented as spring symbol) fitted with the longitudinal structural members 108 and the traverse structural members 110 of the base frame 102 such that there being at least one of the hydraulic jacks 112 (clearly shown in FIGS. 6A and 6B) is fitted with each of the longitudinal structural members 108 and the traverse structural members 110, a plurality of strain gauges such as a strain gauge 114-1, 114-2, 114-3 . . . 114-N (collectively referred as strain gauges 114 hereinafter) attached with the longitudinal structural members 108 and the traverse structural members 110 such that there is at least one of the strain gauges 114 coupled to each of the longitudinal structural members 108 and the traverse structural members 110, at least one at least one standard Wheatstone bridge circuit (not shown) coupled to the strain gauges 114. The strain gauges 112 can be connected into the Wheatstone Bridge circuit with a combination of four strain gauges (full bridge circuit configuration) or two strain gauges (half bridge circuit configuration), or a single strain gauge (quarter bridge circuit configuration). In the half and quarter bridge circuit configurations, the bridge is completed with precision resistors. The strain gauges are configured to detect deformation in form of micro-strain in the longitudinal and the traverse structural members 108/110 and generate first signals based on the detected deformation in the individual structural member.

In an embodiment, the first signals correspond to stress/angle of twist value. The first signals can be a few millivolts.

In an embodiment, the hydraulic jacks 112 can be miniature hydraulic button jacks.

In an embodiment, each of the strain gauges 114 is attached to the respective longitudinal and the traverse structural members 108/110 at predefined orientation. In an exemplary embodiment, the strain gauges 114 can be attached in cross members 110 of base frame in orientation of 45 degree of a shear plane of the base frame 102 to detect value of twist caused by a coupled mode of machinery movement.

In an embodiment, the disclosed device can include at least one signal conditioner unit 116 operatively coupled to the strain gauges 114, and a hydraulic console 118 operatively coupled to the signal conditioner unit 116. The signal conditioner unit 116 (also referred to as signal conditioner hereinafter) is configured to receive the first signals from the strain gauges 114, and generate second signals by performing any or a combination of amplification, filtering and conversion of the first signals. The second signal can be elected DC or AC current. The signal conditioner 116 (clearly shown in FIG. 4) eliminates ground loops, common mode voltages and greatly reduces noise pick-up.

In an embodiment, the hydraulic console 118 is configured to actuate at least two of the hydraulic jacks 112 when value of the received second signals is above a predefined threshold value. Upon actuation, the actuated at least two of the hydraulic jacks 112 stiffens at least one of the longitudinal or transverse structural members 108/110 of the base frame 102. The hydraulic console 118 (clearly shown in FIG. 7) includes electric motor driven hydraulic pump which keeps the device energized to supply hydraulic fluid from a reservoir to the hydraulic jacks 112 on demand generated by the signals received from signal conditioner 116. Each of the hydraulic jacks 112 can be fitted at predefined orientation with respect to the structural members of the base frame 102 for efficient stiffening of the structural members of the base frame 102 upon actuation. The actuated jacks 112 are configured to increase directional stiffness of the at least one of the structural members 108/110 in any or a combination of horizontal direction and vertical direction, which mitigates lateral and coupled modes of movement (rocking and pitching) of machinery.

Figure 10A:
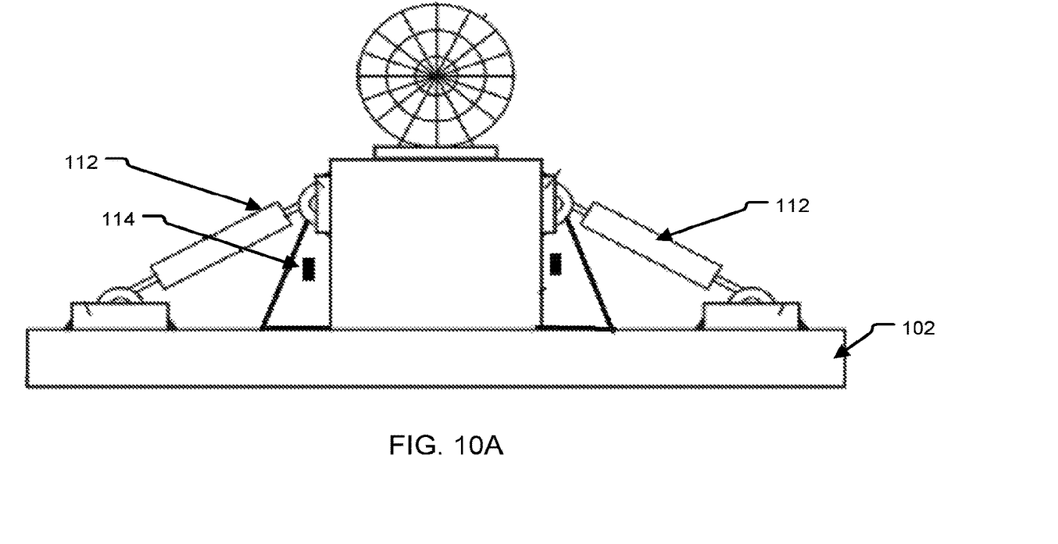
FIGS. 10A, 10B and 10C illustrate exemplary representations of implementation of proposed device with hydraulic turn buckle, in accordance with an embodiment of the present disclosure.
Figure 10B:
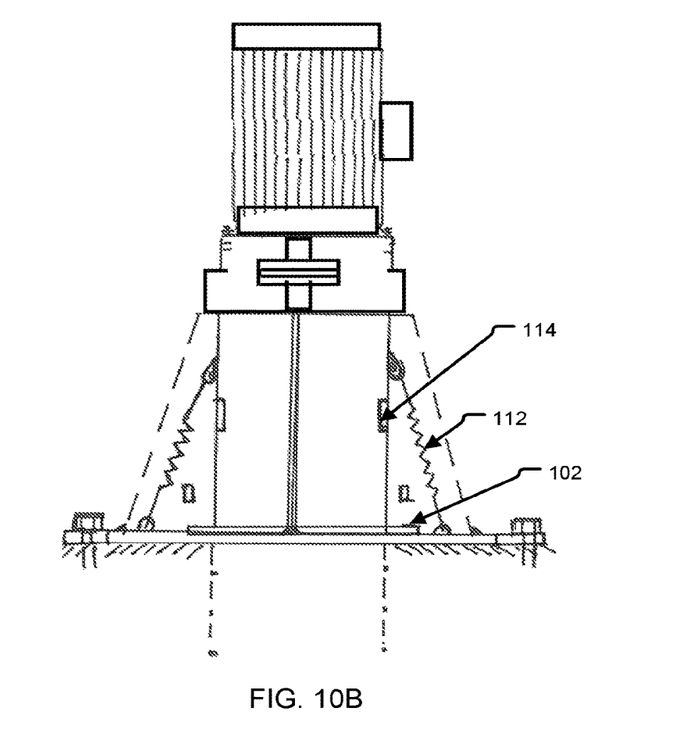

In an exemplary embodiment, for base frame which includes a stool design to mount an electric motor or for a vertical pump, then plurality of strain gauge 114 can be installed just near the gussets or ribs (shown in FIGS. 10A and 10B).

Figure 8:
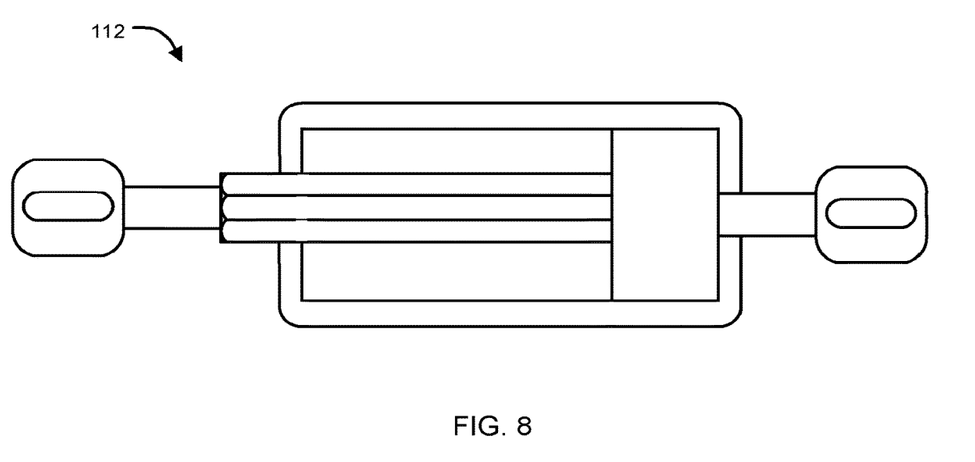
FIG. 8 illustrates an exemplary representation of hydraulic jacksuch as a hydraulic turn buckle of the proposed stiffening device, in accordance with an embodiment of the present disclosure.

In an embodiment, the hydraulic jacks 112 can be hydraulic turn buckles (shown in FIG. 8). The hydraulic turn buckles arrangement can be used for the base frame of an electric drive motor having centre of gravity higher than one meter from top of the base frame for supporting a stool of vertical shaft pumps as shown in FIGS. 10A, and 10B. In an embodiment, the hydraulic button jacks can be inserted into hollow part of base frame area just besides the originally welded cross members for horizontal rotating machines. When the hydraulic jacks are fully engaged with considerable forces in opposed direction, the pipe also can supplement to torsional stiffness to adjacent member and can prevent coupled motion of the machinery structure. The proposed scheme can be applicable to variable speed drives as well as it automatically over-tunes the structure in case operating frequency is close proximity of structural resonance of base frame. With wireless telemetry strain gauge signal processing and acquisition module and wireless telemetry base stations, it is even possible to have one centralized system to activate the autocorrecting devices for multiple installations in a remote plant facility.

Figure 1B:
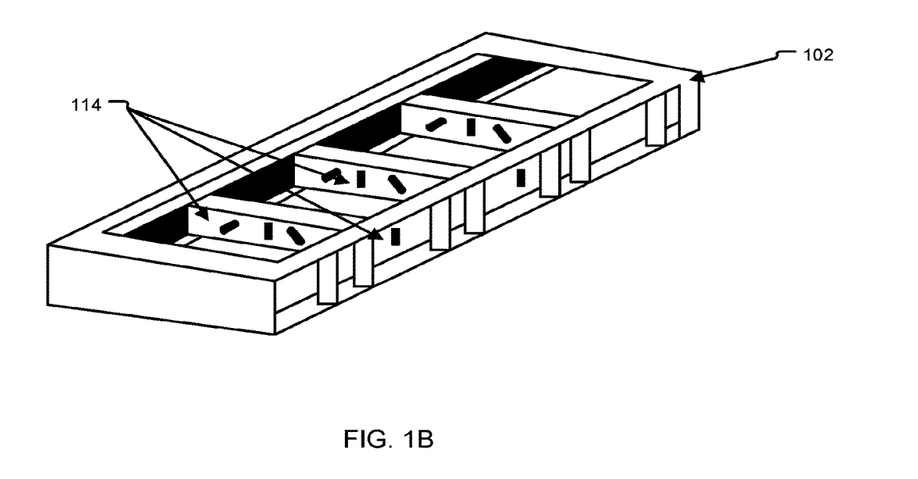
FIG. 1B illustrates exemplary representation a grout-less base frame with strain gauges of the proposed stiffening device, in accordance with an embodiment of the present disclosure.

FIG. 1B illustrates exemplary representation a grout-less base frame with strain gauges of the proposed stiffening device, in accordance with an embodiment of the present disclosure. Location and orientation of the strain gauges 114 coupled to the base frame 102 is shown.

Figure 2:
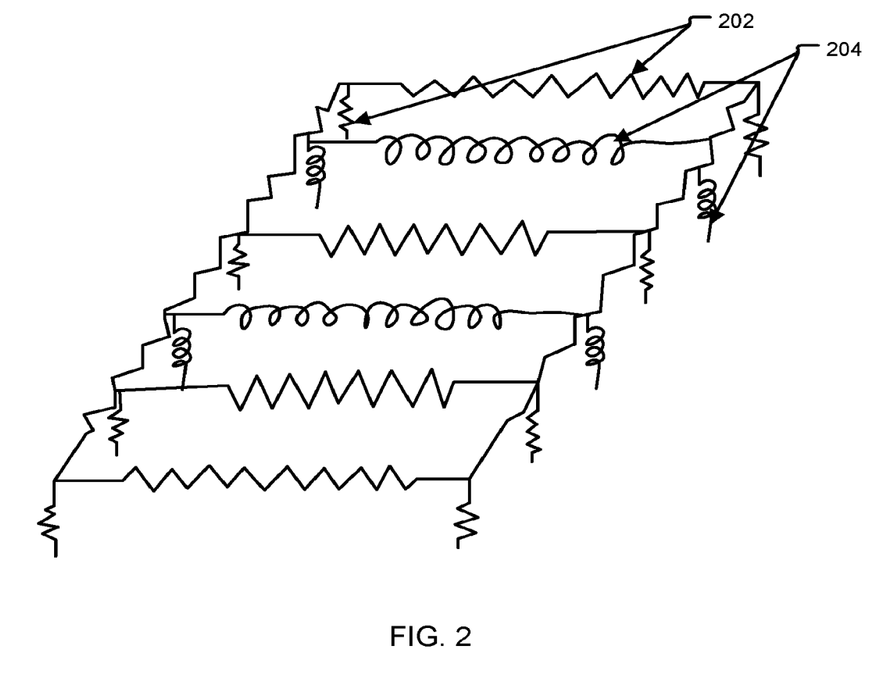
FIG. 2 illustrates an exemplary representation of a stiffness map of the proposed stiffening device, in accordance with an embodiment of the present disclosure.

FIG. 2 illustrates an exemplary representation of a stiffness map of the proposed stiffening device, in accordance with an embodiment of the present disclosure. As shown, spring 202 are used to show as built stiffness (already installed structural member of base frame) and spiral spring 204 are shown where the as built stiffness are supplemented (using jacking devices in horizontal/vertical direction) in event of any structural anomaly of a base frame.

Figure 3:
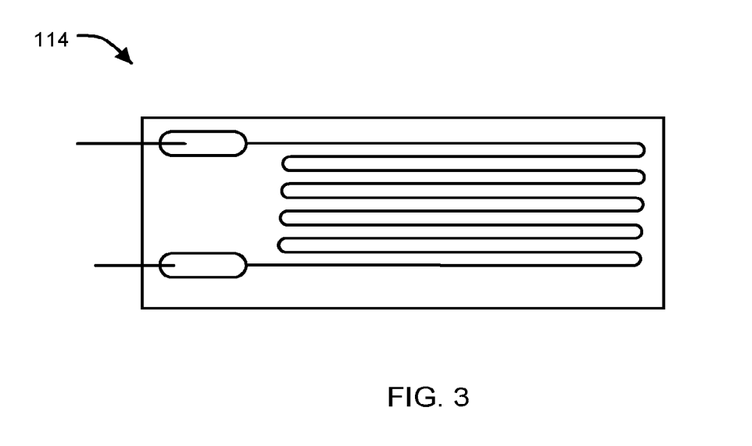
FIG. 3 illustrates an exemplary representation of a strain gauge of the proposed stiffening device, in accordance with an embodiment of the present disclosure.

FIG. 3 illustrates an exemplary representation of a strain gauge of the proposed stiffening device, in accordance with an embodiment of the present disclosure. The strain gauge 114 can be of foiled prewired type which includes a pattern of resistive foil which is mounted on a backing material. The backing material can be made of a dielectric (usually plastic) which provides a good electrical insulation between the wires of the strain gage and the specimen. Strain gauges operate on the principle that as the foil is subjected to stress due to any deflection such as bending/twisting in any axis, the resistance of the foil changes in a defined way. The strain gauges 114 can be of moderate gain factor. The pre-wired strain gauge 114 can be connected via telemetry to the multi-channel signal conditioner 116 as shown in FIG. 4.

Figure 4:
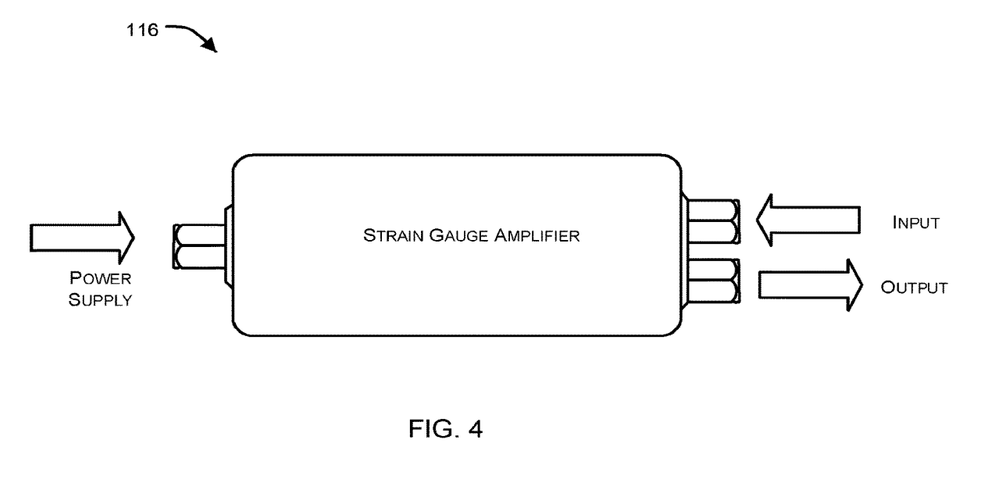
FIG. 4 illustrates an exemplary representation of a signal conditioner of the proposed stiffening device, in accordance with an embodiment of the present disclosure.

FIG. 4 illustrates an exemplary representation of a signal conditioner 116 of the proposed stiffening device, in accordance with an embodiment of the present disclosure. In an embodiment, output (second signals) of the signal conditioner 116 can be in a range of 4 to 20 milliampere.

Figure 5A:
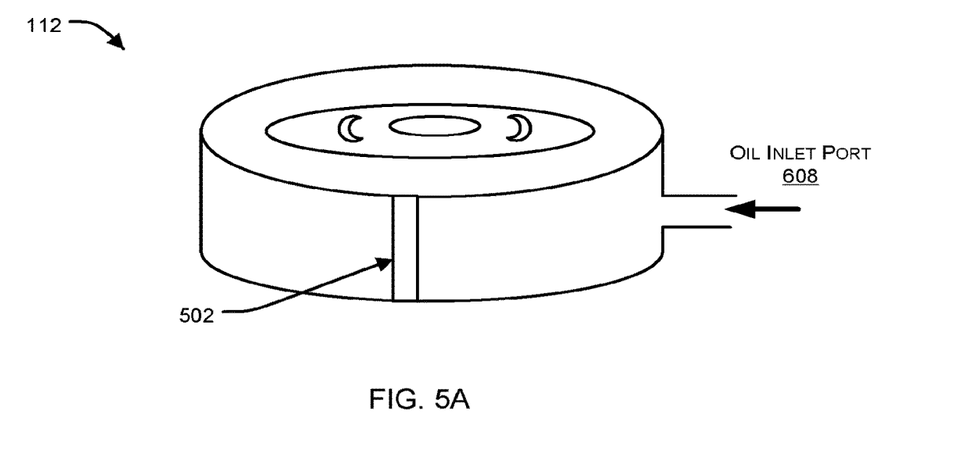
FIGS. 5A and 5B illustrate exemplary representations of a miniature hydraulic button jack with vertical slot and a miniature hydraulic button jack with a horizontal slot, respectively, for the proposed stiffening device, in accordance with an embodiment of the present disclosure.
Figure 5B:
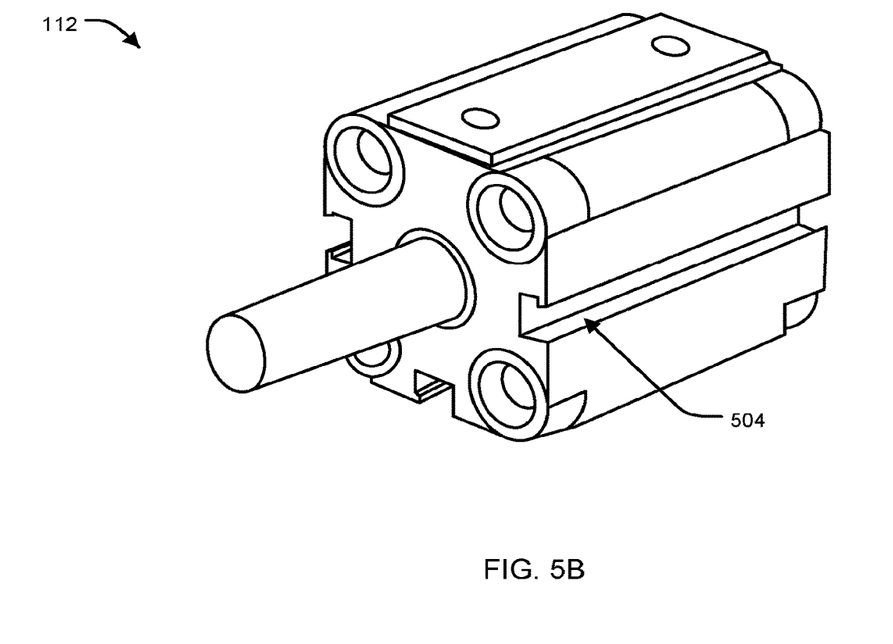

FIGS. 5A and 5B illustrate exemplary representations of a miniature hydraulic button jack with a vertical slot and a miniature hydraulic button jack with a horizontal slot, respectively, for the proposed stiffening device, in accordance with an embodiment of the present disclosure. In an exemplary embodiment, the miniature hydraulic button jack 112 can include a vertical slot 502 (shown in FIG. 5A). In an exemplary embodiment, the miniature hydraulic button jack 112 can include a horizontal slot 502 (shown in FIG. 5B).

Figure 6A:
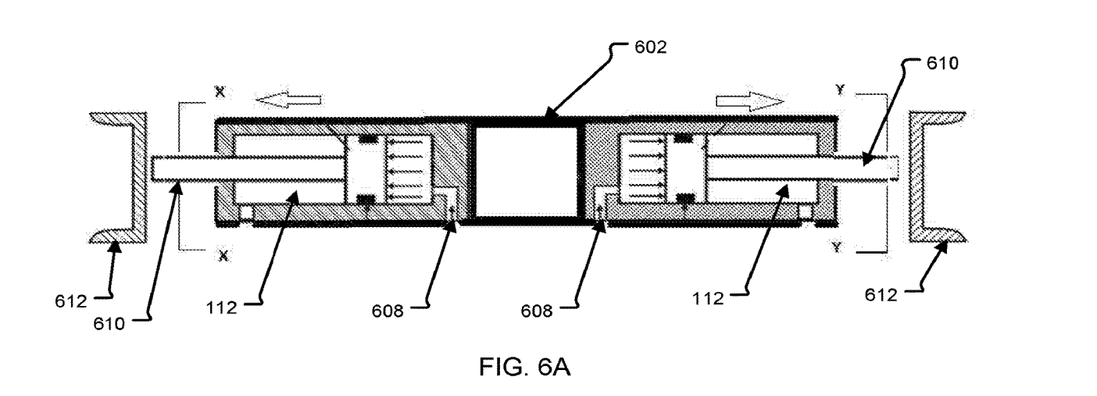
FIGS. 6A, 6B and 6C illustrate exemplary representations of implementation of a miniature hydraulic button jack (hydraulic jack) of the proposed device, in accordance with an embodiment of the present disclosure.
Figure 6B:
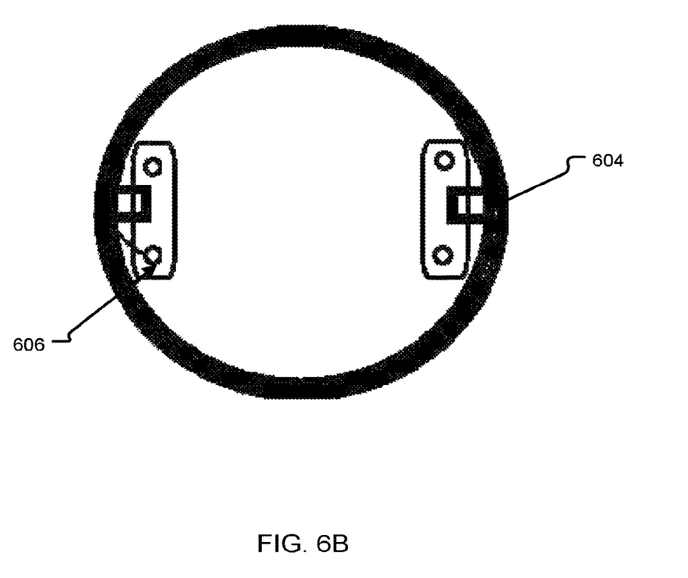
Figure 6C:
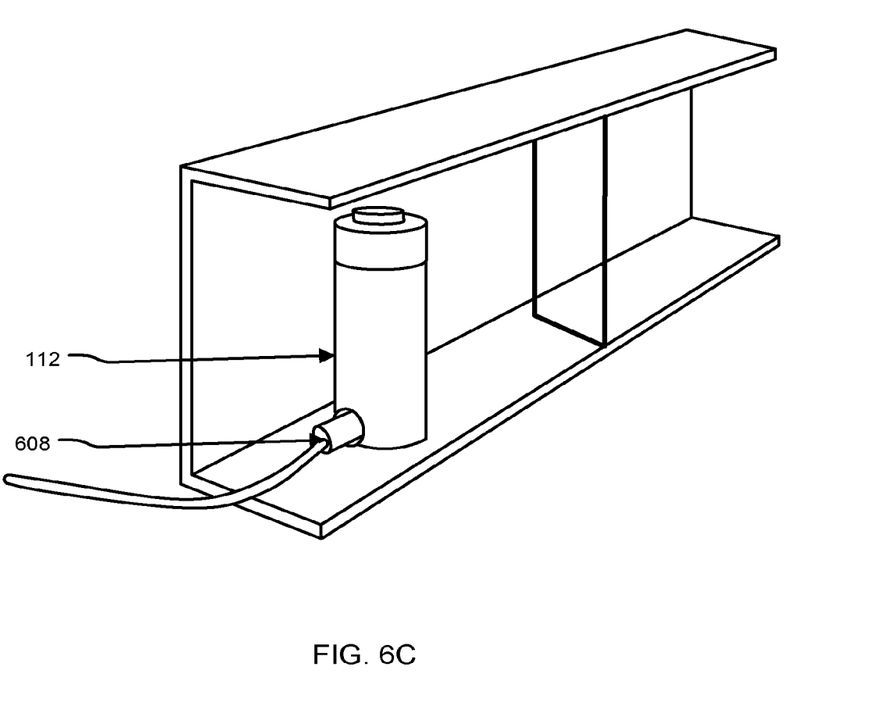

FIGS. 6A, 6B and 6C illustrate exemplary representation of implementation of a miniature hydraulic button jack, in accordance with an embodiment of the present disclosure. The hydraulic button jacks/hydraulic jack 112 (shown in FIGS. 5A and 5B) can be fixed at ends of a hollow pipe 502 of schedule 40 thickness in opposed configuration with ends just touching the longitudinal structural section as shown in FIG. 6A. The hollow pipe 602 has slots at both ends 604 (shown in FIG. 6B) so that the hydraulic jack 112 and the hollow pipe ends make a male female sliding joint. The pipe inner diameter is kept in such way that hydraulic button jack 112 just slides in and then slots are locked on both directions using locking plates and screw 606 (shown in FIG. 6B). The hydraulic oil line is of hydraulic flexible tubing which are manifolded with solenoid operated directional control valves. Hydraulic oil enters through port 608 of both sides simultaneously and miniature jacks 112 extend pistons 610. This action increases the effective stiffness of subject cross members by creating a push force to main longitudinal elements 612.

In an embodiment, the hydraulic jacks can also be placed vertically just beneath the load sensitive positions of a longitudinal structure as shown in FIG. 6C.

Figure 7:
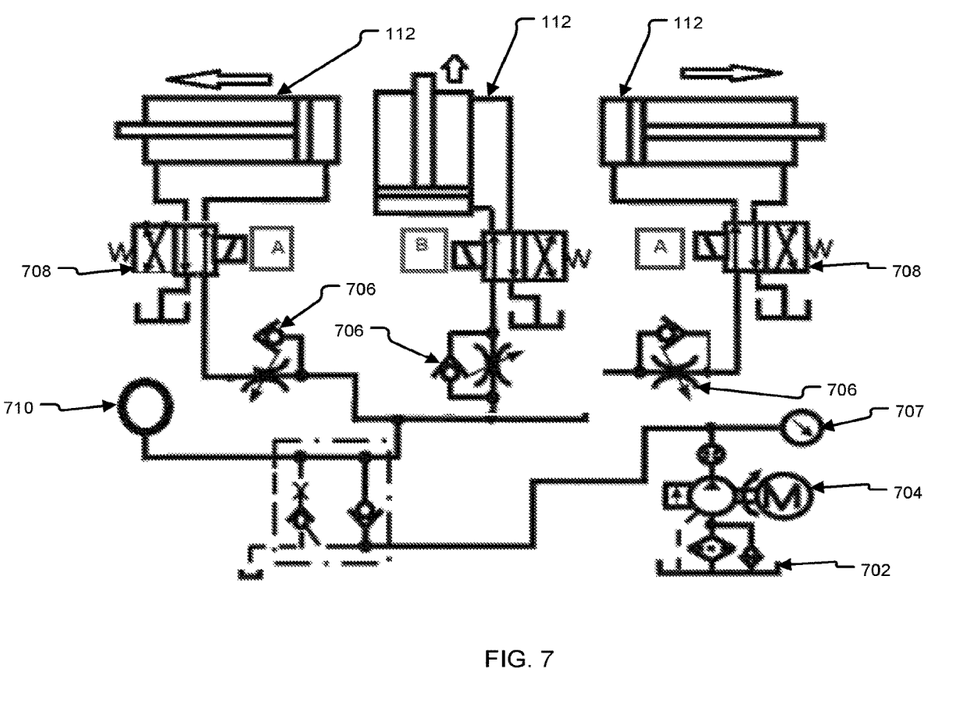
FIG. 7 illustrates an exemplary representation of a hydraulic circuit manifold of a hydraulic console the proposed stiffening device for close loop control, in accordance with an embodiment of the present disclosure.
Figure 9:
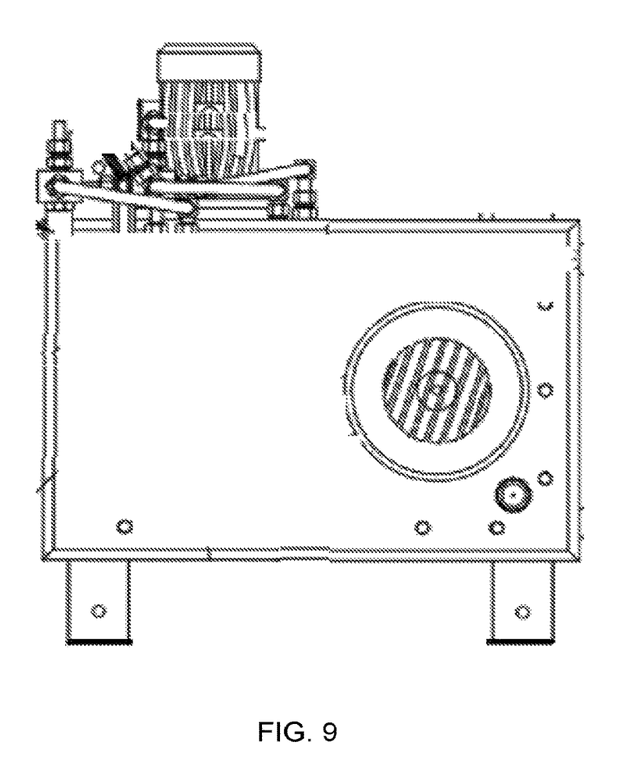
FIG. 9 illustrates an exemplary representation of a hydraulic power pack, in accordance with an embodiment of the present disclosure.

FIG. 7 illustrates an exemplary representation of a hydraulic circuit manifold of a hydraulic console the proposed stiffening device for close loop control, in accordance with an embodiment of the present disclosure. Hydraulic oil is pumped from reservoir 702 by an electric motor driven hydraulic pumps (also referred to as pump hereinafter) 704 through non return valves 706. Solenoid controlled actuators 708 allows the oil to enter the hydraulic jacks 212 (placed at horizontal and vertical positions). A hydraulic accumulator 710 can also be fixed to maintaining oil pressure in loop. The hydraulic circuit manifold can be connected to one common hydraulic power pack (shown in FIG. 9). To facilitate the running of hydraulic hoses, one or two openings can be provided in the base frame as reinforced cut out.

Figure 10C:
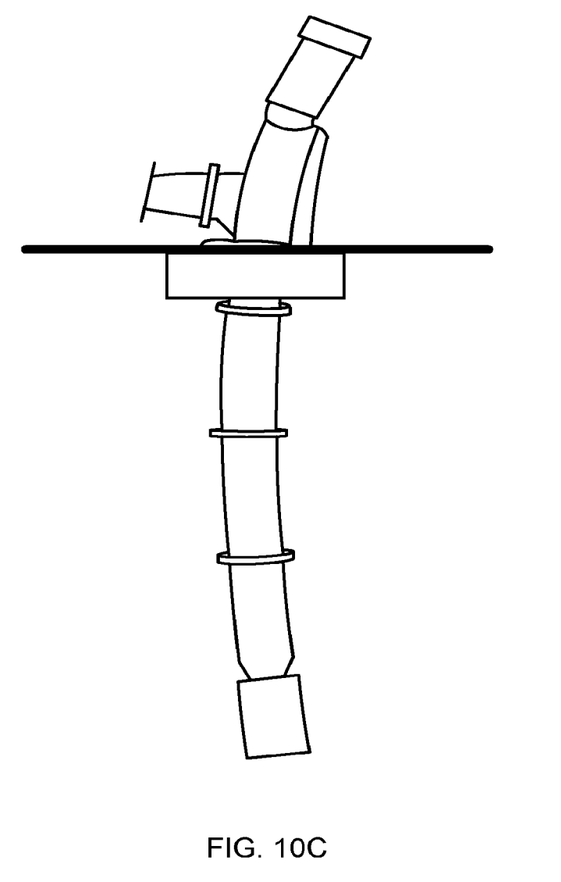

FIGS. 10A, 10B and 10C illustrate exemplary representations of implementation of proposed device with hydraulic turn buckle, in accordance with an embodiment of the present disclosure. For the base frame which includes a stool design to mount electric motor or for a vertical pump, then the hydraulic turn buckle 112 (shown in FIG. 8) can be installed to auto tune the rocking or pitching mode. These hydraulic turn buckle arrangements is also connected a manifold through flexible oil hoses.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Advantages of the Invention

The present disclosure provides a stiffening device for a base frame of rotating machines to increase directional stiffness of structural members of the base frame.

The present disclosure provides a device for mitigating structural anomaly in a base frame of rotating machines.

The present disclosure provides a self-adjusting device for auto correcting structural anomaly in a base frame of a rotating machine.

The present disclosure provides a simple, efficient and cost effective a device for mitigating structural anomaly in a base frame of rotating machines.

I claim:

1. A stiffening device for a base frame, the device comprising:
    a plurality of jacks fitted with structural members of the base frame such that there being at least one of the plurality of jacks fitted with each of the structural members;
    a plurality of strain gauges coupled to the structural members of the base frame such that there being at least one of the plurality of strain gauges coupled to each of the structural members, the plurality of strain gauges coupled to at least one Wheatstone bridge circuit, the plurality of strain gauges configured to detect deformation in the structural members of the base frame and generate first signals based on the detected deformation in the structural members;
    at least one signal conditioner unit operatively coupled to the plurality of strain gauges to receive the generated first signals, the at least one signal conditioner unit adapted to generate second signals by performing any or a combination of amplification, filtering and conversion of the received first signals; and
    a console operatively coupled to the at least one signal conditioner unit to receive the generated second signals,
    wherein the console configured to actuate at least one of the plurality of jacks when value of the received second signals is above a predefined threshold value, and
    wherein upon actuation, the actuated at least one of the plurality of jacks stiffens at least one of the structural members of the base frame.

2. The device as claimed in claim 1, wherein the actuated at least one of the plurality of jacks is configured to increase directional stiffness of the at least one of the structural members in any or a combination of horizontal direction and vertical direction.

3. The device as claimed in claim 1, the plurality of jacks are selected from a group comprises hydraulic button jacks and hydraulic turn buckles.

4. The device as claimed in claim 1, wherein the console is a hydraulic console, and wherein the console comprises at least one electric motor driven hydraulic pump to pump oil from a reservoir through at least one non-return valve, and at least one solenoid controlled actuator to allow the pumped oil to in enter the at least one of the plurality of jacks for actuation of the at least one of the plurality of jacks.

5. The device as claimed in claim 1, wherein the plurality of strain gauges are connected to the at least one Wheatstone bridge circuit in configuration comprises any of a full bridge circuit configuration, half bridge circuit configuration and quarter bridge circuit configuration.

6. The device as claimed in claim 1, wherein each of the plurality of strain gauges is coupled to the structural members at predefined orientation.

7. The device as claimed in claim 1, wherein each of the plurality of jacks is fitted at predefined orientation with respect to the structural members for efficient stiffening of the structural members of the base frame upon actuation.

* * * * *